United States Patent
Marchal et al.

(10) Patent No.: US 9,497,986 B2
(45) Date of Patent: Nov. 22, 2016

(54) METHOD OF IMPROVING SOLUBILITY OF ZINC IN ZINC-CONTAINING STILL DRINKING WATER AND SHELF-STABLE ZINC-CONTAINING STILL DRINKING WATER

(71) Applicant: NESTEC S.A., Vevey (CH)

(72) Inventors: Eric Marchal, Vittel (FR); Yohann Roux, Vittel (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/652,911

(22) PCT Filed: Dec. 4, 2013

(86) PCT No.: PCT/EP2013/075566
§ 371 (c)(1),
(2) Date: Jun. 17, 2015

(87) PCT Pub. No.: WO2014/095375
PCT Pub. Date: Jun. 26, 2014

(65) Prior Publication Data
US 2015/0327589 A1    Nov. 19, 2015

(30) Foreign Application Priority Data
Dec. 18, 2012 (EP) .................................... 12197698

(51) Int. Cl.
| | |
|---|---|
| *A23L 1/304* | (2006.01) |
| *A23L 2/52* | (2006.01) |
| *A23L 2/38* | (2006.01) |
| *B01F 3/04* | (2006.01) |
| *A23L 2/54* | (2006.01) |
| *C02F 1/66* | (2006.01) |
| *C02F 1/68* | (2006.01) |
| *C02F 103/04* | (2006.01) |

(52) U.S. Cl.
CPC .................. *A23L 2/52* (2013.01); *A23L 1/304* (2013.01); *A23L 2/38* (2013.01); *A23L 2/54* (2013.01); *B01F 3/04439* (2013.01); *C02F 1/66* (2013.01); *C02F 1/68* (2013.01); *A23V 2002/00* (2013.01); *A23V 2200/00* (2013.01); *B01F 2215/008* (2013.01); *C02F 1/686* (2013.01); *C02F 2103/04* (2013.01); *C02F 2209/06* (2013.01); *C02F 2209/24* (2013.01)

(58) Field of Classification Search
CPC ........ A23L 2/54; B01F 3/0446; C02F 1/685; C02F 1/686; C02F 1/68; C02F 2209/06; C02F 2209/24; C02F 2209/245
USPC .............................. 426/66, 74, 590, 474, 477
See application file for complete search history.

(56) References Cited

U.S. PATENT DOCUMENTS

2004/0058034 A1    3/2004    Mehansho et al.

FOREIGN PATENT DOCUMENTS

| JP | 2008182948 | 8/2008 |
| RU | 2148031 | 4/2000 |
| WO | 03086110 | 10/2003 |

OTHER PUBLICATIONS

Nestle Pure Life Promotions 2012—New Nestle Mineral Water with Zinc Protection in Pakistani—Printed May 22, 2013—1 page—XP00269755.

Primary Examiner — Helen F Heggestad
(74) Attorney, Agent, or Firm — K&L Gates LLP

(57) ABSTRACT

The present invention relates to an efficient method of improving the solubility of zinc in zinc-containing still drinking water so as to extend its shelf life. This method comprises a carbonating step of said still drinking water with a low carbon dioxide concentration.

20 Claims, 2 Drawing Sheets

METHOD OF IMPROVING SOLUBILITY OF ZINC IN ZINC-CONTAINING STILL DRINKING WATER AND SHELF-STABLE ZINC-CONTAINING STILL DRINKING WATER

CROSS REFERENCE TO RELATED APPLICATIONS

The present application is a National Stage of International Application No. PCT/EP2013/075566, filed on Dec. 4, 2013, which claims priority to European Patent Application No. 12197698.9, filed on Dec. 18, 2012, the entire contents of which are being incorporated herein by reference.

TECHNICAL FIELD

The invention relates to a method of improving the solubility of zinc in zinc-containing still drinking water.

The invention also relates to a shelf-stable zinc-containing still drinking water having a low carbon dioxide concentration and which is contained in a container.

BACKGROUND OF THE INVENTION

Zinc is an essential micronutrient in human nutrition and its importance to human health was recognized relatively recently. It is naturally present or added in some foods, or else available as a dietary supplement.

Zinc is present in many enzymes which are essential for metabolism. It plays a role, in particular, in immune system, protein synthesis, wound healing or DNA synthesis. Zinc also supports normal growth and development during pregnancy, childhood and adolescence, and is required for proper sense of taste and smell.

The human body of a healthy adult contains about 2 to 3 g of zinc. Moreover, a daily intake of zinc is required to maintain a steady state because the body has no specialized zinc storage system. Intake recommendations for zinc are provided in the Dietary Reference Intakes (DRIs) which require about a 10 to 15 mg of dietary zinc per day. These values vary by age and gender.

Generally intake of zinc occurs through food and less frequently through drinking water which is not regarded as an important nutritional source of this element. Indeed, the carbonates, oxides and sulphides of zinc are sparingly soluble, and therefore zinc is present in natural waters at low concentrations.

However, zinc is generally found in small amount in a number of foods (oysters, meats, entrails, whole bread, eggs, fishes, dried vegetables), and poorly diversified feedings can lead to zinc deficiency.

In addition, the World Health Organization has revealed a certain number of countries in which some high zinc deficiencies have been observed, especially for children and pregnant women, due mainly to country-specific foods. Among them, we can mention India, Pakistan or Nigeria.

Providing zinc-containing foods or drinks wherein zinc can be absorbed in an optimal way is then to be considered in many situations and, in particular, in these countries. Furthermore, for practical and economic reasons, it is preferable to add zinc in beverages and especially in drinking water for human consumption.

However, in some zinc-containing waters having specific pH characteristics, for example pH over 7.5 to 8.5, and more particularly in still drinking waters, zinc will combine with water molecules to lead to insoluble hydroxides (i.e. $Zn(OH)_2$). This insoluble component will lead to non-homogeneity of zinc concentration in water and to the presence of unpleasant sediment in the water.

Moreover, in commonly used plastic bottle made, for example, of polyethylene terephthalate (PET), once precipitated in insoluble zinc hydroxide, zinc will interact with the plastic walls of the bottle and will stick to the walls. It is then not possible for a person drinking said water to absorb the whole amount of zinc present in the bottle. Thus, the consumer cannot foresee the absorbed amount of zinc even after finishing the bottle.

This issue of instability of zinc in zinc-containing still drinking waters is accentuated with time. Indeed, pH usually increases during storage and thus zinc-solubility decreases.

As consumer concern grows regarding more natural and healthier food and drinks, there has been a desire to favor the use of natural and healthy means for treating drinking water. These treatments may consist in improving the taste and quality of the water and also improving shelf stability.

It is therefore an object of the invention to provide a method of improving the solubility of zinc in zinc-containing still drinking water which comprises a step of carbonating with low carbon dioxide concentration, or to at least provide a useful alternative. The resulting drinking water may remain homogeneous through its improved solubility of zinc and thus may be compatible with usual conditions and time storage and commercialization of packaged water.

SUMMARY OF THE INVENTION

The present invention provides an efficient method of improving the solubility of zinc in zinc-containing still drinking water, which is the starting drinking water, so as to extend its shelf life. This method comprises at least one step of carbonating said starting drinking water with a low carbon dioxide concentration.

In a first aspect of the invention, there is provided a method of improving the solubility of zinc in zinc-containing still drinking water, which is the starting drinking water, comprising at least one step of carbonating said starting drinking water, wherein the pH of the resulting drinking water is approximately equal to or lower than 7.5.

In a preferred aspect of the invention, the pH of the resulting drinking water is approximately equal to or lower than 7.

In another aspect of the invention, the carbon dioxide concentration in the resulting drinking water is approximately from 5 mg/L to 1000 mg/L, and preferably approximately from 10 mg/L to 750 mg/L or else approximately 10 mg/L to 500 mg/L. The carbon dioxide concentration in the resulting drinking water according to the invention is, in particular, approximately 10 mg/L to 100 mg/L.

In another aspect of the invention, the starting drinking water comprises, approximately, at least 0.5 mg/L of zinc, and preferably approximately from 0.5 mg/L to 30 mg/L or else approximately from 1 mg/L to 5 mg/L.

In another aspect of the invention, said step of carbonating comprises the steps of:
  using a dosing unit to transfer the liquid carbon dioxide from a tank to a dosing valve, and
  opening said dosing valve to transfer said carbon dioxide in solid form into a container, which is, for example, a bottle.

In another aspect of the invention, there is provided a method of improving the solubility of zinc in zinc-containing still drinking as described above, which further comprises a step in which said starting drinking water or said resulting drinking water is filled into a container and wherein said container may be selected from the group comprising glass bottles, plastic bottles such as, for example, PET bottles, cartons, cans or kegs.

In another aspect of the invention, there is provided shelf-stable zinc-containing 3.0 still drinking water having
a carbon dioxide concentration of approximately from 10 mg/L to 1000 mg/L, and
a pH equal to or lower than 7.5,
which is contained in a plastic container, and for example a plastic bottle wherein the plastic is preferably PET.

DETAILED DESCRIPTION

Figure 1:
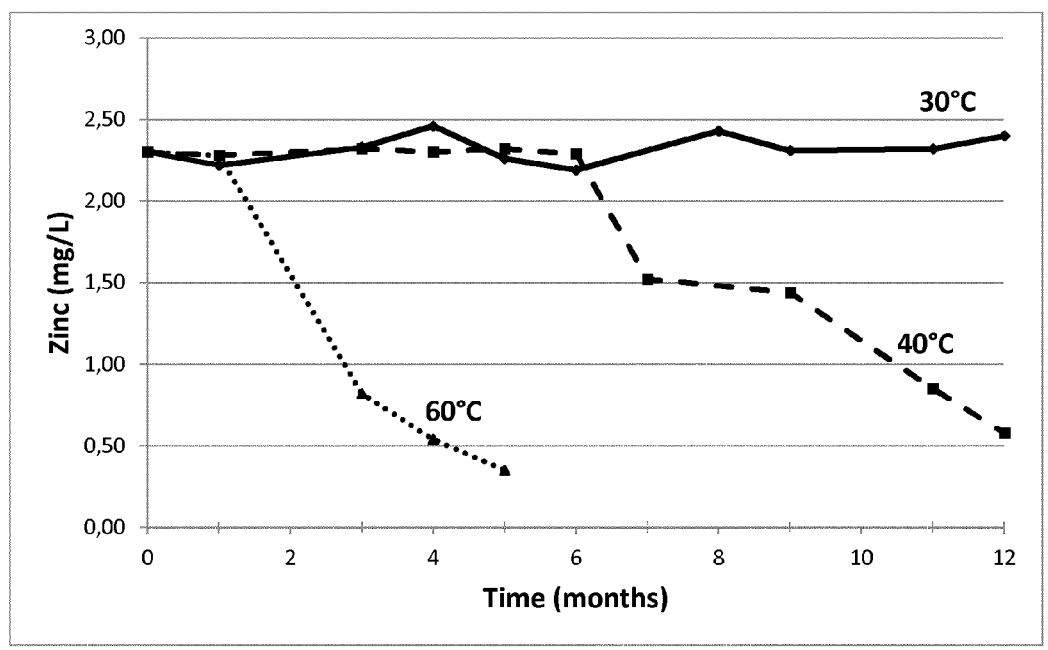
FIG. 1 shows three curves measuring zinc concentration (mg/L) over time (months) in zinc-containing still drinking water stored in darkness at respectively 30° C., 40° C. and 60° C.

The method of improving the solubility of zinc according to the present invention applies to a zinc-containing still drinking water which is called "the starting drinking water".

The improving method according to the invention comprises at least one step of carbonating which means that a specific amount of carbon dioxide is added to the starting drinking water, one or more time(s), so as to obtain the required carbon dioxide concentration in the resulting drinking water.

"The resulting drinking water" is thus the zinc-containing still drinking water obtained after carbonating step.

This carbonating step can be performed with a carbonator beverage filling machine where the carbon dioxide is dosed and dissolved in gaseous form into the beverage. Alternatively, a dosing unit as described in the patent application FR 2 799 137 can be used. Said dosing unit is used to transfer the liquid carbon dioxide from a tank to a dosing valve. When this valve is opened, the liquid carbon dioxide is converted into solid form and may fall directly into the beverage's container. Using the latter device makes it easier to reach the required low carbon dioxide concentration in the resulting still drinking water.

Other methods known to the skilled person may also be used.

The carbonating step may take place before or after the filling phase wherein the zinc-containing still drinking water is filled into the container.

"Still" drinking water, as used herein, means a drinking water where the carbon dioxide concentration remains below approximately 1000 mg/L. Indeed, it has been shown by the inventors that below this concentration sensory threshold, the consumer feels like it is a non-carbonated drinking water. Either the starting drinking water or the resulting drinking water is still drinking water.

"Shelf-stable" zinc-containing drinking water, as used herein, refers to zinc-containing drinking water which remains homogeneous (i.e. zinc remains mainly soluble in water) for at least one month after the preparation, and preferably 6 months or else 12 months. In particular, a zinc-containing drinking water according to the invention is considered shelf-stable when the concentration of soluble zinc in the container, and in particular in the bottle, does not deviate by more than 10% from the initial concentration of soluble zinc just after the preparation of the resulting drinking water.

As used in this specification, the words "comprises", "comprising", and similar words, are not to be interpreted in an exclusive or exhaustive sense. In other words, they are intended to mean including, but not limited to.

Any reference to prior art documents in this specification is not to be considered as an admission that such prior art is widely known or forms part of the common general knowledge in the field.

The invention is further described with reference to the following examples. It will be appreciated that the invention as claimed is not intended to be limited in any way by these examples.

Example 3

The following composition of a zinc-containing still drinking water is prepared in PET bottles of 500 mL:

| $CaCl_2$, $2H_2O$ | $MgSO_4$, $7H_2O$ | $ZnSO_4$, $7H_2O$ | $NaHCO_3$ |
|---|---|---|---|
| 74 mg/L | 102 mg/L | 10 mg/L | 92 mg/L |

The initial concentration of soluble zinc in PET bottles is thus 2.3 mg/L.

The carbonating step is performed in each PET bottle using carbon dioxide cylinders from "Air Liquide" equipped with a dip (siphon) tube, which allows transferring the carbon dioxide in liquid form to a dosing valve. When this valve is opened, the liquid carbon dioxide is converted into solid form (i.e. dry ice) which is then weighted manually. The dry ice is further added into the PET bottle which is closed after addition.

The carbon dioxide concentration in the resulting still drinking water is approximately 20 mg/L.

The step of carbonating is carried out, using the same protocol, either before or after the filling step of the zinc-containing still drinking water so that the pH of the resulting drinking water is 6.8.

The initial pH is measured by using a glass electrode with a pH-meter (NF T 90-008:2001 method).

After their preparation, the storage is done at 30° C., 40° C. and 60° C. in darkness.

Concentrations of soluble zinc are measured using Inductively Coupled Plasma Mass Spectrometer (ICP-MS) at different times during storage (one sample per month, no sample on months 2 and 10).

Measurements of the concentration of soluble zinc were performed, for each result on a PET bottle of 500 mL, by using NF EN ISO 17294-2:2005 method.

The results of this shelf-life study are shown in the following table:

TABLE 1

Concentrations of soluble zinc (in mg/L) in the bottle during storage

| Time (Months) | Temperature during storage | | |
|---|---|---|---|
| | 30° C. | 40° C. | 60° C. |
| 0 | 2.30 | 2.30 | 2.30 |
| 1 | 2.22 | 2.28 | 2.28 |
| 3 | 2.33 | 2.32 | 0.82 |

TABLE 1-continued

Concentrations of soluble zinc (in mg/L) in the bottle during storage

| Time (Months) | Temperature during storage | | |
| --- | --- | --- | --- |
| | 30° C. | 40° C. | 60° C. |
| 4 | 2.46 | 2.30 | 0.54 |
| 5 | 2.26 | 2.32 | 0.35 |
| 6 | 2.19 | 2.29 | ND |
| 7 | ND | 1.52 | ND |
| 8 | 2.43 | ND | ND |
| 9 | 2.31 | 1.44 | ND |
| 11 | 2.32 | 0.85 | ND |
| 12 | 2.40 | 0.58 | ND |

(ND stands for not determine)

FIG. 1 shows the results for the three different temperatures tested. The experimental data show that the zinc-containing still drinking water tested remains shelf-stable during:

at least 1 month at a continuous temperature 60° C.;

at least 6 months at a continuous temperature 40° C.; and at least 12 months at a continuous temperature 30° C.

Therefore, the method according to the invention provides improved solubility of zinc over time in zinc-containing still drinking water. Zinc remains, indeed, soluble during storage for at least 1 month, under the more drastic temperature conditions, when the method according to the invention was implemented.

Example 2

Comparative Example

The following composition of a zinc-containing still drinking water is prepared in PET bottles of 500 mL in an analogous way as for the composition of example 1:

| $CaCl_2, 2H_2O$ | $MgSO_4, 7H_2O$ | $ZnSO_4, 7H_2O$ | $NaHCO_3$ |
| --- | --- | --- | --- |
| 74 mg/L | 102 mg/L | 11 mg/L | 92 mg/L |

The initial concentration of soluble zinc in PET bottles is thus 2.5 mg/L.

No carbonating step was, then, performed.

The initial pH is measured using a glass electrode with a pH-meter (NF T 90-008:2001 method) and is 7.4.

After their preparation, the storage is done at 30° C., 40° C. and 60° C. in darkness.

Concentrations of soluble zinc are measured using Inductively Coupled Plasma Mass Spectrometer (ICP-MS) at different times during storage (one sample per month after 1, 2, 3 and 4 months).

Measurements of the concentration of soluble zinc were performed, for each result on a PET bottle of 500 mL, by using NF EN ISO 3.7294-2:2005 method.

The results of this shelf-life study are shown in the following tables:

TABLE 2

Concentrations of soluble zinc (in mg/L) in the bottle during storage

| Time (Months) | Temperature during storage | | |
| --- | --- | --- | --- |
| | 30° C. | 40° C. | 60° C. |
| 0 | 2.51 | 2.51 | 2.51 |
| 1 | 2.50 | 2.50 | 1.15 |
| 2 | 2.41 | 2.41 | 0.65 |
| 3 | 2.40 | 1.40 | 0.27 |
| 4 | 2.56 | 1.07 | 0.21 |

Figure 2:
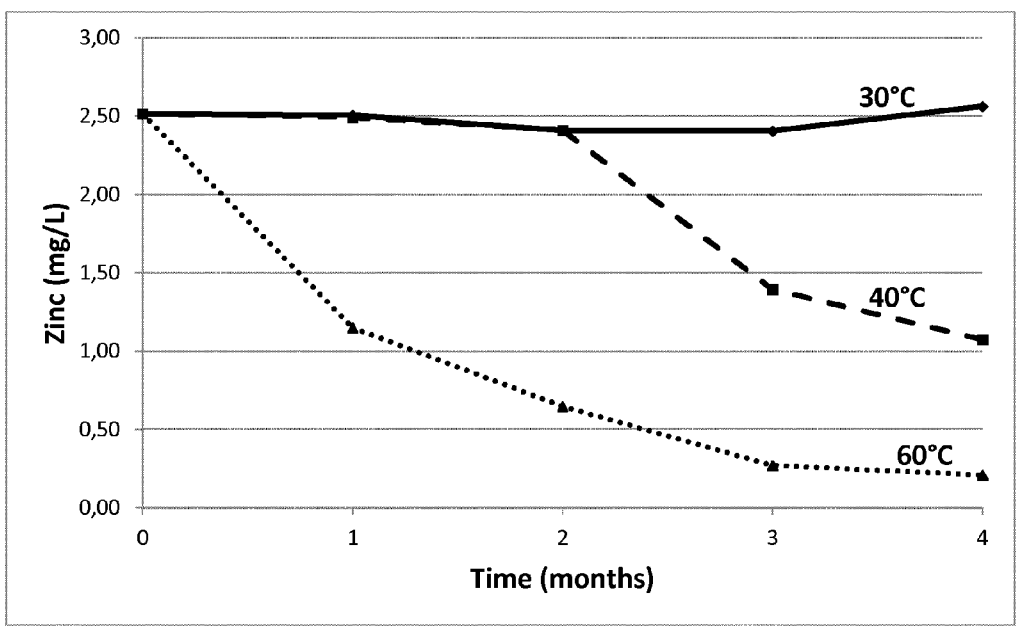
FIG. 2 shows three curves measuring zinc concentration (mg/L) over time (months) in zinc-containing still drinking water stored in darkness at respectively 30° C., 40° C. and 60° C.

FIG. 2 shows the results for the three different temperatures during 4 months. The experimental data show that the solubility of zinc in the zinc-containing still drinking water tested is decreased compared with the one observed for example 1.

Indeed, after 2 months, almost all the zinc of the zinc-containing still drinking water stored at 60° C. has precipitated. Moreover, when the zinc-containing still drinking water is stored at 40° C., more than 57% of the zinc has precipitated after 4 months.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification."

The invention claimed is:

1. A method of improving the solubility of zinc in zinc-containing still drinking water, which is the starting drinking water, comprising carbonating the starting drinking water, wherein the pH of the resulting drinking water is equal to or less than 7.5 and the carbon dioxide concentration in the resulting drinking water is from 5 mg/L to 1000 mg/L.

2. The method of claim 1, wherein the pH of the resulting drinking water is equal to or less than 7.

3. The method of claim 1, wherein the pH of the resulting drinking water is equal to or less than 6.8.

4. The method of claim 1, wherein the carbon dioxide concentration in the resulting drinking water is from 10 mg/L to 750 mg/L.

5. The method of claim 1, wherein the carbon dioxide concentration in the resulting drinking water is from 10 mg/L to 500 mg/L.

6. The method of claim 1, wherein the carbon dioxide concentration in the resulting drinking water is from 10 mg/L to 100 mg/L.

7. The method of claim 1, wherein the starting drinking water comprises at least 0.5 mg/L of zinc.

8. The method of claim 1, wherein the starting drinking water comprises between 0.5 mg/L to 30 mg/L of zinc.

9. The method of claim 1, wherein the step of carbonating comprises the steps of:

using a dosing unit to transfer carbon dioxide as a liquid from a tank to a dosing valve, and opening the dosing valve to transfer the carbon dioxide in solid form into a container.

10. The method of claim 1, comprising a step in which the starting drinking water or the resulting drinking water is filled into a container.

11. The method of claim 10, wherein the container is selected from the group consisting of glass bottles, plastic bottles, cartons, cans and kegs.

12. The method of claim 11, wherein the plastic bottles comprise are in polyethylene terephthalate.

13. A zinc-containing still drinking water obtainable by carbonating a starting drinking water, wherein the pH of the resulting drinking water is equal to or less than 7.5 and the carbon dioxide concentration in the resulting drinking water is from 5 mg/L to 1000 mg/L.

14. A shelf-stable zinc-containing still drinking water having:
- a carbon dioxide concentration of 10 mg/L to 1000 mg/L,
- a pH equal to or lower than 7.5; and
- which is contained in a plastic container.

15. The shelf-stable zinc-containing still drinking water of claim 14, wherein the container is a polyethylene terephthalate bottle.

16. The shelf-stable zinc-containing still drinking water of claim 14, wherein the carbon dioxide concentration is from 10 mg/L to 750 mg/L.

17. The shelf-stable zinc-containing still drinking water of claim 14, wherein the carbon dioxide concentration is from 10 mg/L to 500 mg/L.

18. The shelf-stable zinc-containing still drinking water of claim 14, wherein the carbon dioxide concentration in the resulting drinking water is from 10 mg/L to 100 mg/L.

19. The zinc-containing still drinking water of claim 13, wherein the starting drinking water comprises between 0.5 mg/L to 30 mg/L of zinc.

20. The zinc-containing still drinking water of claim 13, wherein the carbon dioxide concentration in the resulting drinking water is from 10 mg/L to 100 mg/L.

* * * * *